United States Patent [19]
Cooper

[11] Patent Number: 5,673,317
[45] Date of Patent: Sep. 30, 1997

[54] SYSTEM AND METHOD FOR PREVENTING UNAUTHORIZED PROGRAMMING OF WIRELESS NETWORK ACCESS DEVICES

[75] Inventor: Gershon N. Cooper, Encino, Calif.

[73] Assignee: Ora Electronics, Inc., Chatsworth, Calif.

[21] Appl. No.: 408,737

[22] Filed: Mar. 22, 1995

[51] Int. Cl.⁶ .................................................. H04K 1/00
[52] U.S. Cl. .................................. 380/23; 380/4; 380/25
[58] Field of Search ............................... 380/4, 23, 25

[56] References Cited

U.S. PATENT DOCUMENTS 5,371,794  12/1994  Diffie et al. ........................... 380/21
5,495,531  2/1996  Smiedt .................................. 380/4
5,539,824  7/1996  Bjorklund et al. ................... 380/21

*Primary Examiner*—David C. Cain
*Attorney, Agent, or Firm*—Matthew F. Jodziewicz

[57] ABSTRACT

In a wireless network access device, access to which is controlled by a control program retained in a memory in the device, a method of preventing unauthorized access to the device comprising the steps of: storing in the memory of the device, data representing a key code and an access enabling code; reading the key code from the device and generating, in accord with a known method, an access code based thereon; and, comparing the access code with the access enabling code and, if equal, enabling access to the device, otherwise denying access to the device. The invention also includes a system and a wireless network access device both of which prevent unauthorized access for reprogramming purposes.

24 Claims, 2 Drawing Sheets

SYSTEM AND METHOD FOR PREVENTING UNAUTHORIZED PROGRAMMING OF WIRELESS NETWORK ACCESS DEVICES

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. General and Particular Scope of the Invention

The present invention relates in general to wireless network access devices and, in particular, for a method, system and apparatus providing security for preventing unauthorized programming of wireless network access devices.

2. The Problem

The number of providers of wireless services is growing at an ever increasing pace, offering new services and competing for a large, but finite number of potential customers.

Service providers and carriers are fighting for the same limited group of potential customers. They make money not from the sale of various wireless devices, such as a cellular telephone or pager, but from usage by these devices on their offered service. In other words, their concern is selling "air time" not hardware.

However, to sell "air time", a customer must have ready access to hardware that uses "air time." Hence, service providers and carriers have a strong interest in increasing the number of wireless network access devices being used. Increasing the number of wireless network access devices available normally equates to sales of new devices, or special activation or rebate programs designed to lure customers from rival services or carriers.

As part of their marketing plan, therefore, many service providers and carriers have begun subsidizing the sales price of wireless network access devices to potential customers, requiring in turn that the subsidized device will be activated on and exclusively use their services for at least a certain minimum period of time.

With a customer guaranteed to activate and exclusively use the service for a known period of time, typically two or so years, the service provider and carrier can anticipate not only recouping their subsidy of the sales price, but also a profit in excess of the amount subsidized.

Further, by lowering the sales price of the wireless device, the devices are now available to new customers who would not, or could not, afford to purchase a device at the higher non-subsidized price. Therefore, potentially more "air time"0 will be used than if the prices of devices were higher.

While in theory this marketing plan is beneficial for a carrier or service provider, it requires that the subsidized device actually be activated and used with the service provider or carrier that subsidized the price reduction. If a customer were to purchase a device at a subsidized price and activate and use it with a rival service provider or carrier, the one who subsidized the cost would not only lose the potential profit, but experience an immediate and direct loss in having paid the subsidy.

Purchasing a subsidized device from one service provider or carrier and activating the device with another service provider or carrier is known as "churning" in the industry.

Many subsidizing service providers and carriers therefore require immediate activation of the device with their service before the customer leaves the store. However, until now there was no known method which prevented unauthorized reprogramming of the subsidized device for activation on another service provider or carrier once the customer left the store, i.e., "anti-churning" protection.

Another problem facing the industry is the unauthorized reprogramming of stolen wireless network access devices, i.e., "piracy", or even the sale of subsidized devices to unauthorized markets not covered by the service provider or carrier, e.g., selling subsidized devices overseas by a dishonest distributor or retailer.

OBJECTIVES AND SUMMARY OF THE INVENTION

It is therefore an object of the present invention to provide a method, system and device that will prevent unauthorized reprogramming of the device.

In general, the present invention is embodied in a method used with a wireless network access device, access to which is controlled by a control program retained in a memory in the device, that prevents unauthorized access to the device. The method includes the steps of:

storing, in the memory of the device, data representing a key code and an access enabling code;

reading the key code from the device and generating, in accord with a known method, an access code based thereon; and, comparing the access code to the access enabling code and, if equal, enabling access to the device, otherwise denying access to the device.

Likewise, the present invention is also found in a system for use with a wireless network access device, access to which is controlled by a control program retained in a memory in the device, for preventing unauthorized access to the device. Such a system includes: Circuitry or programming that stores in the memory of the device, data representing a key code and an access enabling code; Circuitry or programming that reads the key code from the device and generates, in accord with a known method, an access code based thereon; Circuitry or programming that compares the access code to the access enabling code and, if equal, enabling access to the device, otherwise denying access to the device.

The present invention is also found in a wireless network access device that includes a control program, retained in the device, controlling access to the device. A memory device, such as RAM, ROM, EEPROM, or the like, that is coupled to the control program, for storing data representing a key code and an access enabling code. Data bus circuitry is connected to the memory device for communicating data to and from the memory device. The device has circuitry, such as an Input/Output data bus interface connector, that is capable of receiving an access code from an external source. In operation, the control program compares the access code to the access enabling code and, if equal, enables access to the device, otherwise denies access to the device.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT OF THE INVENTION

Figure 1:
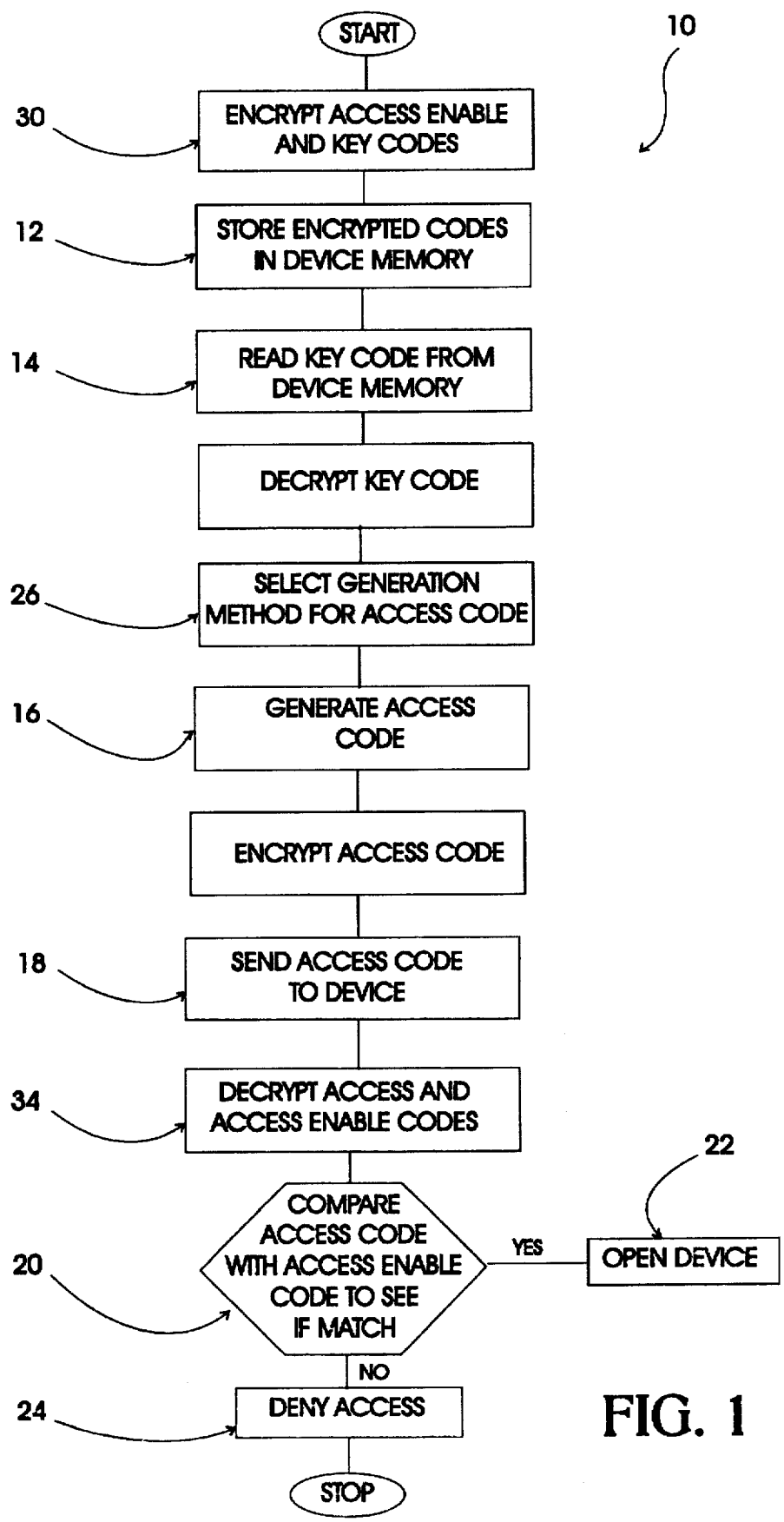
FIG. 1 is an idealized flow chart showing the logic flow of a method embodying the present invention; and, FIG. 2 is an idealized block diagram showing the various operating components that would be found in a preferred embodiment of the present invention in a system and a device.
Figure 2:
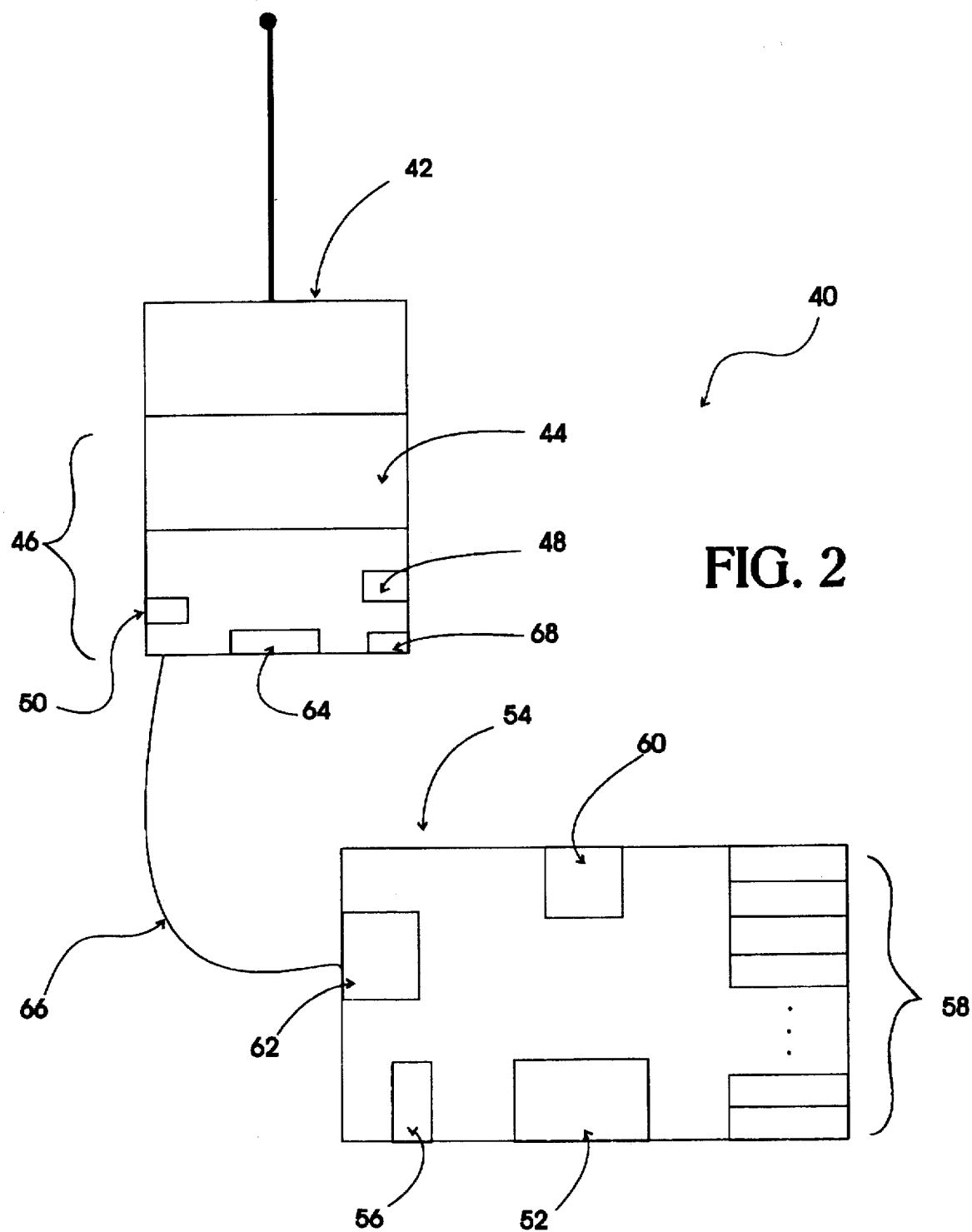

With reference to the accompanying drawings in FIGS. 1 and 2, preferred embodiments and operation of the invention are now described.

A preferred method embodying the present invention is used in association with a wireless network access device, access to which is controlled by a control program retained in a memory in the device.

Wireless network access devices include access devices for wireless systems, such as the cellular system connecting telephones, modems, facsimile machines and the like, as well as wireless devices operating on the Parallel Communications System (PCS), Personal Communications Net (PCN), Global Speciale Mobile (GSM), Specialized Mobile Radio (SMR), Extended Specialized Mobile Radio (ESMR), and other wireless systems.

The method 10, as shown in FIG. 1, begins by storing 12 in the memory of the device, data representing a key code and an access enabling code. This is preferably done before the device enters general public availability such as by the manufacturer, or by the subsidizing service provider or carrier before distributing the devices to its distributors or retailers.

Whenever the device is to be unlocked for programming or reprogramming, an external unlocking device is first coupled to the device. The external unlocking device reads the key code stored in the memory of the device 14 and generates, in accord with a known method, an access code based thereon 16. The external unlocking device may also obtain the key code from the device by sending a query command to the control program in the device and having the device supply the key code via a communications bus, an Input/Output data bus interface connector, or the like.

Once the external unlocking device has generated the access key, it provides the access code to the control program 18 for making a comparison as described below. Normally, this will be accomplished using the same communications bus or media used to obtain the key code data from the device, but it can utilize a different media for additional security.

Once the device has received the generated access code from the external unlocking device, the control program now compares 20 the access code it received from the external unlocking device with the access enabling code stored in its memory, and, if equal, the control program "unlocks" or enables programming access to the device 22. Otherwise, if the two codes are mismatched, the control program aborts any further programming attempts and denies access to the device 24.

Alternate methods for even greater security include additional steps such as the following:

The external unlocking device can contain a plurality of methods for generating the access code where one of the methods is selected for generating the access code based on a known selection method 26.

Such selection methods include any logically determinable method such as dividing the key code into at least a first and a second data field, and selecting a method for generating the access code based on at least one of the key code data fields.

Once the method has been selected 26 by reference to one of these data fields, the method then generates the access code based upon one or more other data fields in the key code 16.

Another alternate method includes encrypting and decrypting the data both as it passes between the device and the external unlocking device and even as stored data within the device itself.

Such an encryption/decryption method includes encrypting the data in the key and access enable codes 28 and storing the encrypted data in the memory of the device 12. The control program can also be encrypted for further security.

The encrypted key code data is sent 14 to the external unlocking device which decrypts 30 the key code data and generates the access code 16 based on the decrypted data.

Before the external unlocking device sends the access code data to the device 18, it encrypts 32 the data in the access code to avoid unauthorized interception of the data while in transit between the two devices.

Finally, the control program of the device has the data in the access code received from the external unlocking device decrypted 34, along with the stored access enable code if it was encrypted, and the comparison 20 is made.

FIG. 2 illustrates the present invention as embodied in a system 40 that is used with a wireless network access device 42, access to which is controlled by a control program 44 retained in a memory 46 in the device 42, for preventing unauthorized access to the device. Such a system 40 comprises circuitry for storing in the memory of the device, data representing a key code 48 and an access enabling code 50. The memory storage device 46 may be a ROM, RAM or the like storage device in which data can be stored for retrieval.

Circuitry 52 in an external unlocking device 54 reads the key code 48 from the device memory 46, and generates, in accord with a known method, an access code 56 based thereon.

Once the circuitry 52 has generated the access code 56, the access code 56 is provided to the control program 44 of the device 42 for further processing in determine if the attempted access is authorized or not.

Circuitry in the device 42, which may embody the control program 44, compares the access code 56 generated by the external unlocking device 54 to the access enabling code 50 stored in the device 42, and, if equal, enables access to the device otherwise the circuitry denies access to device 42 as being unauthorized.

For greater security, additional circuitry may be added to the external unlocking device 54 that provides a plurality of methods 58 for generating the access code 56. Such circuitry must also provide a determinate method 60 by which one of the access code generation methods 58 is selected.

As an example of this latter type of circuitry, includes circuits that divide (or read) key code 48 into multiple data fields. The circuitry then operates for selecting one of the access code generating methods 58 based on at least one of the data fields in key code 48.

An alternate embodiment for even greater security would include circuitry in both device 42 and external unlocking device 54 for encrypting and decrypting the data stored in the access, key and access enabling codes. This circuitry operates both on data stored in device 42 as well as on data transferred between device 42 and external unlocking device 54 to prevent an unauthorized interception of the data were it in plain text.

The present invention is also embodied in a wireless network access device 42 also shown in FIG. 2 that includes a control program 44, retained in the device, that controls access to the device.

The device has a memory storage device 46, such as ROM, RAM, EEPROM, or the like, that is coupled to the device control program 44, for storing data representing a key code 48 and an access enabling code 50.

There is data bus circuitry 64 that permits data transfer between the device 42 and outside peripherals, such as external device 54, for communicating with the outside world. This data bus circuitry 64 can be a standard Input/Output data bus interface port connector using a cable 66 for connection to an outside peripheral, or an optical link, such as infrared, or a radio frequency link.

Data bus circuitry 64 can receive an externally generated access code from an outside peripheral such as external device 54 connected to device 42 through data bus circuitry 64.

The device control program circuitry 44 compares the externally generated access code 56 with the access enabling code 50 stored internally in device 42, and, if the two codes are determined to be equal, the device control program circuitry 44 enables access to device 42, otherwise the control program circuitry 44 denies access to device 42.

Finally, as disclosed above, for even greater security, circuitry 68 can be added to device 42 for encrypting and decrypting the data stored in the access, key code and access enabling codes to prevent an unauthorized interception of such code data either as it is communicated between device 42 and outside peripherals on data bus circuitry 64, or directly from the memory storage 46 of device 42.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. In a wireless network access device, access to which is controlled by a control program retained in a memory in the device, a method of preventing unauthorized access to the device comprising the steps of:

storing in the memory of the device, data representing a key code and an access enabling code;

reading said key code from the device and generating, in accord with a known method, an access code based thereon; and, comparing said access code to said access enabling code and, if equal, enabling access to the device, otherwise denying access to the device.

2. A method as in claim 1 wherein said step of comparing said access code to said stored access enabling code and, if equal, permitting access to the device, otherwise denying access to the device further includes the step of:

providing said access code to the control program for making said comparison.

3. A method as in claim 1 further including the steps of:

providing a plurality of methods for generating said access code; and, selecting one of said plurality of methods for generating said access code based on a known selection method.

4. A method as in claim 3 further including the steps of:

dividing said key code into at least a first and a second data field;

selecting one of said plurality of methods for generating said access code based on at least one of said at least first and second data fields in said key code; and, generating, in accord with said selected method for generating said access code, said access code based upon at least one of said first and second data fields in said key code.

5. A method as in claim 1 wherein said step of storing in the memory of the device data representing a key code and an access enabling code further includes the step of:

encrypting the data in said key code and said access enable code and storing the encrypted data as said key code and said encrypted access enable code in the memory of the device.

6. A method as in claim 5 wherein said step of reading said key code from the device and generating, in accord with a known method, an access code based thereon, further includes the steps of:

decrypting the data in said key code and generating said access code based on the decrypted data; and, encrypting the data in said access code and storing the encrypted data as said access code.

7. A method as in claim 6 wherein said step of comparing the access code to said access enabling code and, if equal, enabling access to the device, otherwise denying access to the device, further includes the step of:

decrypting the data in said access code and in said access enabling code.

8. In a wireless network access device, access to which is controlled by a control program retained in a memory in the device, a system for preventing unauthorized access to the device comprising:

means for storing in the memory of the device, data representing a key code and an access enabling code;

means, external from the wireless network access device, for reading said key code from the device and generating, in accord with a known method, an access code based thereon; and, means for comparing said access code to said access enabling code and, if equal, enabling access to the device, otherwise denying access to the device.

9. A system as in claim 8 wherein said means for comparing said access code to said access enabling code and, if equal, permitting access to the device, otherwise denying access to the device, further includes:

means for providing said access code to the control program for making said comparison.

10. A system as in claim 9 wherein said means for providing said access code to the control program for making said comparison comprises an input/output data bus port on the access device; and, means for connecting said input/output data bus port to said external means for generating said access code.

11. A system as in claim 10 wherein said means for connecting said input/output data bus port to said external means for generating said access code comprises a cable.

12. A system as in claim 10 wherein said means for connecting said input/output data bus port to said external means for generating said access code comprises an optical communications link.

13. A system as in claim 12 wherein said optical communications link is an infrared communications link.

14. A system as in claim 10 wherein said means for connecting said input/output data bus port to said external means for generating said access code comprises a radio frequency link.

15. A system as in claim 8 further comprising:

means for providing a plurality of methods for generating said access code; and, means for selecting one of said plurality of methods for generating said access code based on a known selection method.

16. A system as in claim 15 further comprising:

means for dividing said key code into at least a first and a second data field;

means for selecting one of said plurality of methods for generating said access code based on at least one of said at least first and second data fields in said key code; and, means for generating, in accord with said selected method for generating said access code, said access code based upon at least one of said first and second data fields in said key code.

17. A system as in claim 8 further comprising:

means for encrypting and decrypting the data stored in said access code, said key code and said access enabling code.

18. A wireless network access device comprising:

a control program, retained in the device, controlling access to the device;

memory means, coupled to said control program, for storing data representing a key code and an access enabling code;

means, connected to said memory means, for communicating data to and from said memory means; and, means for receiving an access code, said control program adapted for comparing said access code to said access enabling code and, if equal, enabling access to the device, otherwise denying access to the device.

19. A device as in claim 18 further including:

means for encrypting and decrypting the data stored in said access code, said key code and said access enabling code.

20. A system as in claim 18 wherein said means, connected to said memory means, for communicating data to and from said memory means comprises:

an input/output data bus port on the access device; and, means for connecting said input/output data bus port to an external means for generating said access code.

21. A system as in claim 20 wherein said means, connected to said memory means, for communicating data to and from said memory means comprises a cable.

22. A system as in claim 20 wherein said means, connected to said memory means, for communicating data to and from said memory means comprises an optical communications link.

23. A system as in claim 22 wherein said optical communications link is an infrared communications link.

24. A system as in claim 20 wherein said means, connected to said memory means, for communicating data to and from said memory means comprises a radio frequency link.

* * * * *